United States Patent
Hasegawa et al.

(10) Patent No.: US 7,733,074 B2
(45) Date of Patent: Jun. 8, 2010

(54) CONTROL CIRCUIT OF CURRENT MODE DC-DC CONVERTER AND CONTROL METHOD OF CURRENT MODE DC-DC CONVERTER

(75) Inventors: Morihito Hasegawa, Kasugai (JP); Takashi Matsumoto, Kasugai (JP); Ryuta Nagai, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 94 days.

(21) Appl. No.: 11/936,933

(22) Filed: Nov. 8, 2007

(65) Prior Publication Data
US 2008/0111530 A1 May 15, 2008

(30) Foreign Application Priority Data
Nov. 10, 2006 (JP) .............................. 2006-305333

(51) Int. Cl.
G05F 1/00 (2006.01)
G05F 1/613 (2006.01)
(52) U.S. Cl. ...................... 323/284; 323/224
(58) Field of Classification Search ............... 323/284, 323/224, 283
See application file for complete search history.

(56) References Cited

U.S. PATENT DOCUMENTS 7,242,170 B1 * 7/2007 Natsume .................... 323/222
7,378,826 B2 * 5/2008 Liao .......................... 323/283
7,456,623 B2 * 11/2008 Hasegawa et al. .......... 323/285

FOREIGN PATENT DOCUMENTS

| JP | 2005-086992 A | 3/2005 |
| JP | 2005-287165 A | 10/2005 |

* cited by examiner

*Primary Examiner*—Shawn Riley
(74) *Attorney, Agent, or Firm*—Arent Fox LLP

(57) ABSTRACT

To provide a control circuit of a current mode DC-DC converter, a current mode DC-DC converter and a control method thereof having excellent high-speed responsiveness with respect to fluctuations in output voltage. The control circuit of the current mode DC-DC converter serves as a DC-DC converter 1 that controls a peak value of a coil current and comprises a window comparator that detects whether an output voltage VOUT is within a predetermined voltage range including a target voltage, and a peak current setting unit that sets a peak current setting value of a coil current to a lower limit value or an upper limit value in response to a high or low voltage level of the output voltage VOUT, in the case that the output voltage VOUT is not within the predetermined voltage range including the target voltage.

13 Claims, 3 Drawing Sheets

FIG. 1 CIRCUIT DIAGRAM OF DC-DC CONVERTER ACCORDING TO FIRST EMBODIMENT

FIG. 2 CIRCUIT DIAGRAM OF DC-DC CONVERTER ACCORDING TO SECOND EMBODIMENT

CIRCUIT DIAGRAM OF CONVENTIONAL DC-DC CONVERTER

CONTROL CIRCUIT OF CURRENT MODE DC-DC CONVERTER AND CONTROL METHOD OF CURRENT MODE DC-DC CONVERTER

CROSS-REFERENCE TO RELATED APPLICATIONS

This application is based upon and claims the benefit of priority from the prior Japanese Patent Application No. 2006-305333 filed on Nov. 10, 2006, the entire contents of which are incorporated herein by reference.

BACKGROUND

1. Field

The field relates to a current mode DC-DC converter, more particularly, it relates to a current mode DC-DC converter with excellent high-speed responsiveness with respect to fluctuations in the output voltage.

2. Description of Related Art

A DC-DC converter disclosed in Japanese Patent Publication No. 2005-86992 is constituted of a switching power source unit 110 in which a switching element capable of being turned ON/OFF at a high frequency is turned ON/OFF to convert an input voltage Vin of a direct current into an output voltage Vout of a direct current, and a control unit 112 that controls the ON/OFF operation of the switching element provided in the switching power source unit 110.

The control unit 112 comprises an error amplifier 114, a switching control circuit 116, a bias current selection circuit 122 and a resistance voltage dividing circuit 144. Further, the error amplifier 114 comprises a differential amplifier 138 consisting of operational amplifiers, a constant current source circuit 140 that supplies a bias current to each unit inside the differential amplifier 138, and an output circuit connected between an output terminal of the differential amplifier 138 and a ground potential.

The differential amplifier 138 comprises a differential input unit that generates a differential voltage of an input voltage, and a voltage amplifying unit and the like that amplifies a differential voltage supplied from the differential input unit. These units are adapted to operate under a bias current I supplied from the constant current source circuit 140. Thus, as the bias current I increases, the response sensitivity or response speed of the differential amplifier 138 also increases.

The constant current source circuit 140 comprises at least two independent constant current source circuits 140A and 140B connected in parallel. A first constant current source 140A steadily supplies a constant bias current IA to each unit provided in the differential amplifier 138. The second constant current source 140B is controlled to ON/OFF by the bias current selection circuit 122A to be described later, so that the second constant current source 140B is kept in an OFF state when the error amplifier 114 has a first response characteristic and is switched to an ON state when the error amplifier 114 has a second response characteristic.

The bias current selection circuit 122 compares the feedback signal KVout obtained in the switching power source unit 110 and outputted from the resistance voltage dividing circuit 144 with an upper limit monitoring value AM, and selects IA as the bias current to be supplied from the constant current source circuit 140 to each unit provided in the differential amplifier 138, when KVout≦AM (the second constant current source 140B is kept in an OFF state), and selects the (IA+IB) when KVout>AM (the second constant current source 14B is placed in an ON state).

When the direct current output voltage Vout is out of the range of the upper limit monitoring value AM, the response characteristic of the error amplifier 114 is switched to the one with higher responsiveness, whereby the switching control operation in the control unit 112 is continued without stopping the switching control operation of the control system. As a result, the system can respond quickly and suitably even in the case of abrupt and significant fluctuations in the input voltage in normal operating conditions, without causing any interruptions in the operation of the control system.

Additionally, another similar technology is disclosed in the Japanese Patent Publication No. 2005-287165.

In the technology disclosed in the Japanese Patent Publication No. 2005-86992, the response characteristic of the error amplifier 114 is switched from the bias current IA to (IA+IB) when the direct current output voltage Vout is out of the range of the upper limit monitoring value AM, thereby switching to the characteristic with higher responsiveness to carry out the switching control operation. However, even when switching to the characteristic with a higher responsiveness, the responsiveness gradient is changed up to several times only, which creates a problem that the system may not be capable of adequately responding to an abrupt change in the output voltage.

SUMMARY

It is an aspect of the embodiments discussed herein to provide a control circuit of a current mode DC-DC converter controlling a peak value of a coil current, the control circuit including an output voltage detecting unit detecting whether or not an output voltage is within a predetermined voltage range including a target voltage and a peak current setting unit setting a peak current setting value of the coil current to a lower limit value or an upper limit value in response to a high or low voltage level of the output voltage when the output voltage is not within the predetermined voltage range including the target voltage.

The above and further objects and novel feature of the disclosure will more fully appear from the following detailed description when the same is read in connection with the accompanying drawings. It is to be expressly understood, however, that the drawings are for the purpose of illustration only and are not intended as a definition of the limits of the disclosure.

DETAILED DESCRIPTION OF THE PREFERRED EMBODIMENTS

An embodiment of a control circuit of a current mode DC-DC converter, a current mode DC-DC converter and a control method thereof according to the disclosure will be described in detail hereinafter with reference to FIG. 1 and FIG. 2.

First Embodiment

Figure 1:
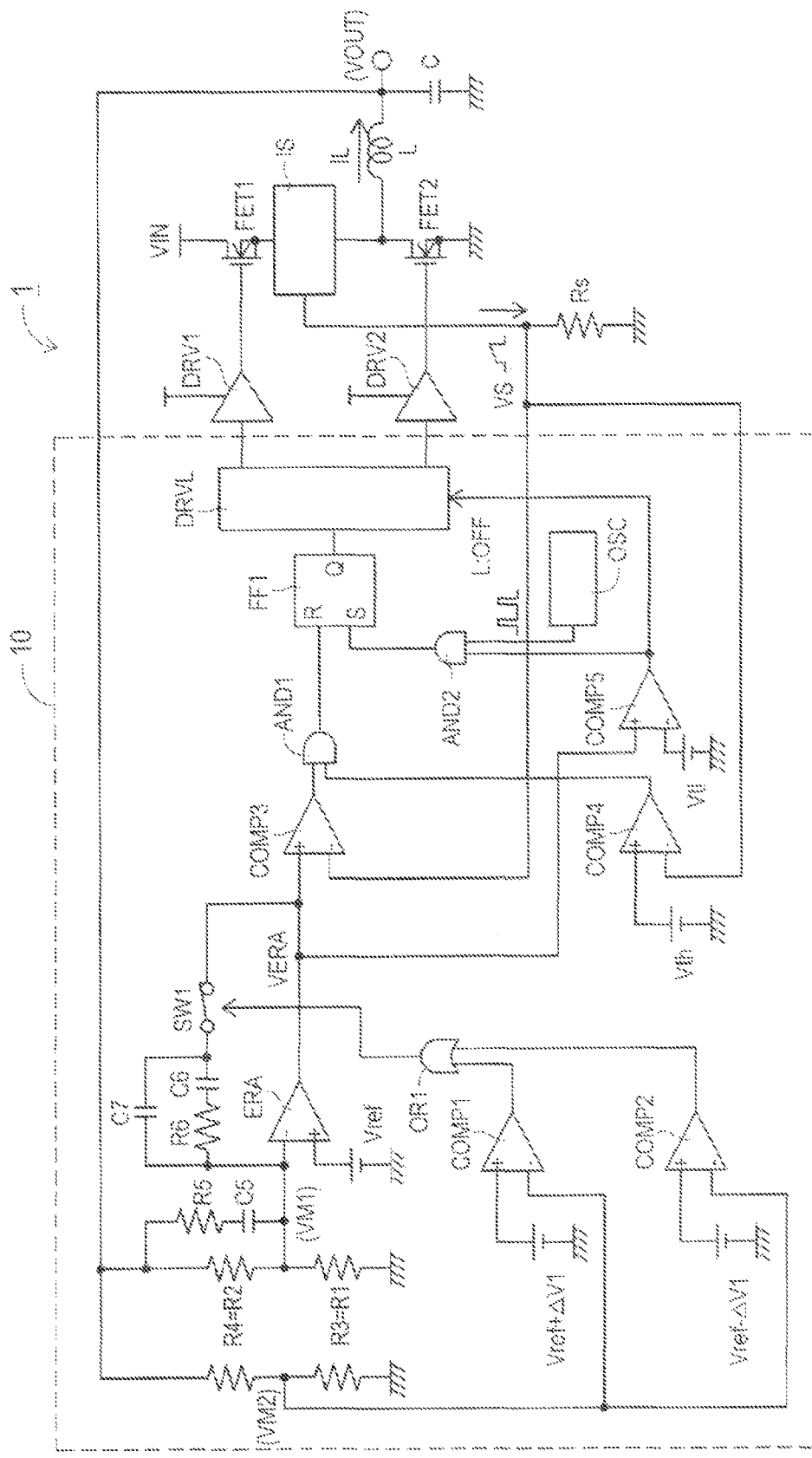
FIG. 1 is a circuit diagram showing a configuration of a DC-DC converter according to a first embodiment.

FIG. 1 is a circuit diagram showing a configuration of a DC-DC converter 1 according to the first embodiment. The step-down DC-DC converter 1 comprises a main switching element FET1, a synchronous switching element FET2, a current detector IS consisting of a current mirror circuit and adapted to detect a current that flows to the main switching element FET1, a conversion resistor Rs that converts the detected current of the main switching element FET1 into a voltage, an inductor L, a smoothing capacitor C, a main-side driver DRV1 that drives the main switching element FET1, a synchronous-side driver DRV2 that drives the synchronous switching element FET2, and a control unit 10.

An output terminal (VOUT) is connected to a load that is not shown and to a smoothing capacitor C for supplying an electrical charge to the load. In the control unit 10, resistor elements R2 and R1 are connected in series from the output voltage VOUT towards a ground potential to detect an output voltage VOUT. Further, a resistor element R5 and a capacitative element C5 for phase compensation are connected in parallel to the resistor element R2.

The voltage dividing point (VM1) of the resistor elements R2 and R1 serves as a detecting point of the output voltage VOUT and is connected to an inversion input terminal (−) of the error amplifier ERA. A non-inversion input terminal (+) of the error amplifier ERA is connected to a reference voltage Vref. An output of the error amplifier ERA is connected to a non-inversion input terminal (+) of a next-stage comparator COMP3. An inversion input terminal (−) of the comparator COMP3 receives a current detection voltage VS that was detected by the current detector IS and converted by the conversion resistor Rs. The current detection voltage VS is obtained by converting the detection signal of the current supplied from the input voltage VIN to the inverter L through the main switching element FET1, into voltage.

A phase compensation is formed from the output of the error amplifier ERA towards the inversion input terminal (−). The phase compensation is connected to the inversion input terminal (−) of the error amplifier ERA, in other words, to a branching point (VM1) of the resistor elements R2 and R1 which serves as the detecting point of the output voltage VOUT, through the resistor element R6 and the capacitative element C6 which are connected in series, and the capacitative element C7 connected in parallel with elements R6 and C6, and through a switch SW1 that opens and closes a return loop passing through the above elements. The opening and closing of switch SW1 is controlled by an output of a window comparator to be described later.

On the one hand, the output voltage VOUT is subjected to voltage division carried out by the resistor elements R4 and R3 having the same resistance value as the resistor elements R2 and R1. The voltage dividing point (VM2) of the resistor elements R4 and R3 has the same potential as the voltage dividing point (VM1) of the resistor elements R2 and R1. In the comparator COMP1, the voltage dividing point (VM2) is connected to an inversion terminal (−), while an upper limit threshold voltage (Vref+ΔV1) is connected to the non-inversion terminal (+). In the comparator COMP2, a lower limit threshold voltage (Vref+ΔV1) is connected to the non-inversion terminal (+), and the voltage dividing point (VM2) is connected to the inversion terminal (−). The outputs of the comparator COMP1 and the comparator COMP2 are connected to an input of an OR gate OR1.

As a result, the output of the OR gate OR1 is at a high level if the VM2>Vref+ΔV1 or VM2<Vref−ΔV1, and at a low level is Vref+ΔV1≧VM2≧Vref−ΔV1. In other words, the comparator COMP1, comparator COMP2 and the OR gate OR1 constitute a window comparator that outputs a low level only when the voltage dividing point voltage VM2 is within a range from a lower limit threshold voltage (Vref−ΔV1) to an upper limit threshold voltage (Vref+ΔV1).

The comparator COMP4 serves as a current limiter and is adapted to output a low level when the current detection voltage VS becomes equal to or higher than an upper limit voltage Vth. Further, the comparator COMP5 serves as a comparator that carries out PFM control, and is adapted to transmit an output of an oscillator OSC to a set terminal (S) of an RS flip flop FF1, through an AND gate AND2, when the output of the error amplifier ERA becomes equal to or higher than the lower limit threshold voltage Vt1.

The output of the comparator COMP3 is connected to a reset terminal (/R) of the RS flip flop FF1 through the AND gate AND1. The output of the comparator COMP4 serving as a current limiter is connected to one terminal of the AND gate AND1. The contents of the RS flip flop FF1 are reset by a low level signal supplied from the AND gate AND1. The contents of the RS flip flop FF1 are set at a set terminal (S) of the RS flip flop FF1 in response to an output from the AND gate AND2, and a high level output signal is outputted from output terminal (S).

When a high level is inputted from the RS flip flop FF1 and a high level is inputted from the comparator COMP5 to the driving logic circuit DRV1, a high level is outputted to the main-side driver DRV1 and a low level is outputted to the synchronous-side driver DRV2. When the output from the comparator COMP5 becomes a low level, a low level is outputted to the main-side driver DRV1, and a high level is outputted to the synchronous-side driver DRV2.

In a NMOS-type main switching element FET1, the drain terminal is connected to the input voltage VIN, and the source terminal is connected to one terminal of the inductor L. Also, in the NMOS-type synchronous switching element FET2, the drain terminal is connected to one terminal of the inductor L, and the source terminal is connected to the ground potential. The other terminal of the inductor L is connected to the output terminal (VOUT).

The DC-DC converter 1 having the above-described connection configuration according to the first embodiment serves as a step-down synchronous rectifier-type DC-DC converter in which the switching control is carried out in the so-called current mode.

When the main switching element FET1 is made conductive and one terminal of the inductor L is connected to the input voltage VIN, a larger voltage as compared to the output voltage VOUT at the other terminal is applied to the one terminal, which causes an increase in the current that flows in the inductor L in a predetermined time gradient decided by voltage difference between the terminals and an inductance value. The electromagnetic energy accumulated in the inductor L increases and power is supplied to a smoothing capacitor C and a load which is not shown. When the main switching element FET1 becomes non-conductive and the synchronous switching element FET2 becomes conductive, a current flows continually to inductor L, the current having a current value continuity with the current just before a non-conductive state, due to the need for continuity with the electromagnetic energy accumulated in the inductor L until that point. Since this current is supplied through the synchronous switching element FET2, one terminal of the inductor L becomes almost equivalent to the ground potential, so that a lower voltage is applied to the one terminal, as compared to the other terminal of the output voltage VOUT. As a result, the current decreases with a negative time gradient. The electromagnetic energy accumulated in the inductor L is discharged to the smoothing capacitor C and the load which is not shown, together with the current flowing through the synchronous switching element FET2.

To maintain the output voltage VOUT at a predetermined voltage value while supplying power to the smoothing capacitor C and a load which is not shown, the output voltage VOUT is detected at a branching point (VM1), and the timing at which the main switching element FET1 and the synchronous switching element FET2 become conductive and non-conductive is adjusted. The output voltage VOUT becomes equivalent to a target voltage in a state that the detected voltage VM1 at the branching point (VM1) is coincident with the reference voltage Vref. In the DC-DC converter 1, the output voltage VOUT is constantly fed back to obtain a constant output voltage VOUT centered around the target voltage by controlling the voltage to a value around the reference voltage Vref.

The RS flip flop FF1 is set by an output signal supplied from the AND gate AND2, and a high level signal is outputted from the Q output terminal, whereby conduction of the main switching element FET1 is started. A detected voltage VM1 which is voltage-divided at the branching point (VM1) of the resistor elements R2 and R1 is inputted to the error amplifier ERA, and a differential voltage of the detected voltage VM1 with respect to the reference voltage Vref is subjected to error amplification, whereby an error amplified voltage VERA is outputted. If in the error amplified voltage VERA the detected voltage VM1 is insufficient as compared to the reference voltage Vref, a high voltage corresponding to the amount of voltage deficit is outputted. In the comparator COMP3, the error amplified voltage VERA is compared with the current detection voltage VS, and if the current detection voltage VS exceeds the error amplified voltage VERA, a low level reset signal is outputted. As a result, the RS flip flop FF1 is reset and a low level signal is outputted from the Q output terminal, thereby making the main switching element FET1 conductive.

The timing when the main switching element FET1 becomes non-conductive is determined by the timing at which the current detection voltage VS reaches a voltage level of the error amplified voltage VERA. Since the main switching element FET1 becomes nonconductive at this timing, a peak current value to be inputted to the inductor L through the main switching element FET1 is determined according to the degree of output voltage VOUT deficit with respect to the target voltage. In other words, if the deficit of the output voltage OUT with respect to the target voltage is small, differential voltage between the detected voltage VM1 and the reference voltage Vref becomes small as well, which thus causes the voltage level of the error amplified voltage VERA obtained by subjecting the differential voltage to error amplification to become low. In a small current detection voltage VS, the output voltage of the comparator COMP3 is reversed to a low level so that the main switching element FET1 becomes nonconductive. The peak current to be inputted to the inductor L becomes small. If the output voltage VOUT drops significantly from the target voltage, the deficit amount of the detected voltage VM1 with respect to the reference voltage Vref becomes large as well, so that the voltage level of the error amplified voltage VERA obtained by subjecting the differential voltage to error amplification becomes a high voltage level. The output voltage of the comparator COMP3 is reversed to a low level to reach a large current detection voltage VS, so that the main switching element FET1 becomes nonconductive. The peak current to be inputted to the inductor L becomes large.

The signal to be inputted from the AND gate AND 2 to an S terminal of the RS flip flop FF1 serves as a pulse signal generated based on a predetermined periodic clock signal to be outputted from the oscillator OSC. Control is carried out in the current mode switching regulator by controlling the peak current to be inputted to the inductor L depending on the deficiency amount of the output voltage VOUT for each period of pulse signals to be outputted from the oscillator OSC.

According to this circuit configuration, when the switch SW1 is made conductive, phase compensation formed from the output of the error amplifier ERA to the inversion input terminal (−) through the resistor element R6, capacitative element C6 and capacitative element C7 is generally employed in a control system in which feedback control is carried out in the DC-DC converter, etc. As a result of applying a negative feedback from the output with respect to an abrupt change in the detected voltage VM1 to the inversion input terminal (−), an abrupt excessive response is controlled to some degree, thereby stabilizing the control system. However, since the phase compensation works in the direction of preventing a change in the detected voltage VM1 by using the error amplified voltage VERA, an excessive negative feedback may possibly suppress a recovery operation of the output voltage VOUT with respect to an abrupt change in the output voltage VOUT. There may be cases that there is no alternative but to sacrifice the excessive response characteristic to maintain the stability of the system.

It is perceived that when the high-speed responsiveness is pursued up to an extreme limit, phase compensation cannot be provided between the input and output of the error amplifier EPA. In this case, the differential voltage of the detected voltage VM1 with respect to the reference voltage Vref to be inputted to the error amplifier ERA, can be subjected to error amplification by a gain of the error amplifier ERA. However, if the differential voltage is subjected to error amplification by a large gain which is not negatively fed back, the control system becomes unstable and oscillates due to the feed-back control of the system in which the voltage goes from the detected voltage VM1 to the output voltage VOUT and then returns to the detected voltage.

In the DC-DC converter 1 of the first embodiment, a switch SW1 that opens and closes a phase compensation is provided to achieve both a high-speed responsiveness that employs a gain of the error amplifier ERA which is not provided with phase compensation, and stability of the control system obtained by providing phase compensation.

Switch SW1 is constituted of a known analog switch and is controlled by an output value of the window comparator consisting of the comparators COMP1 and COMP2 and OR gate OR1. If the output value of the OR gate OR1, in other words, the output value of the window comparator is at a high level, the switch SW1 is opened, and if the output value of the window comparator is at a low level, the SW1 is closed.

As a result, if the target voltage is out of the $\Delta V1$ range as shown by VM2>Vref$\Delta V1$ or VM2<Vref−$\Delta V1$, a high-speed response is carried out that employs a gain of the error amplifier ERA which is not provided with phase compensation, and if Vref+$\Delta V1 \geq$ VM2 $\geq$ Vref−$\Delta V1$, control is stably carried out by providing phase compensation.

As described in detail in the above text, according to the control circuit of the DC-DC converter, the DC-DC converter and the control method thereof according to the first embodiment, if the output voltage is not within a predetermined voltage range including a target voltage, the peak current setting value of the coil current is set to a lower limit value or an upper limit value in response to a high or low voltage level of the output voltage. As a result, the peak current setting value can be set in a minimum necessary period.

The DC-DC converter 1 according to the first embodiment comprises: an error amplifier ERA that amplifies a differential voltage of the output voltage VOUT with respect to the target voltage; a phase compensation (resistor element R6, capacitative element C6 and capacitative element C7) connected between the input and output of the error amplifier ERA to stabilize the operational state of the control system; and a switch SW1 that cuts off the phase compensation from the error amplifier in the case that the output voltage VOUT is not within a predetermined voltage range including the target voltage, to thus set the peak current setting value of the coil current. As a result, it is possible to achieve both a high-speed responsiveness that employs the gain of the error amplifier ERA in which phase compensation is not provided, and the stability of the control system obtained by providing phase compensation.

Further, the DC-DC converter 1 according to the first embodiment is provided with the comparator COMP1 that judges that the voltage VM2 at the voltage dividing point is higher than the upper limit threshold voltage (Vref+ΔV1) which is a predetermined voltage range; the comparator COMP2 that judges that the voltage VM2 at the voltage dividing point is lower than the lower limit threshold voltage (Vref−ΔV1) which is a predetermined voltage range, and an OR gate OR1 that executes a logical operation OR on the output signal supplied from the comparator COMP1 and the output signal supplied from the comparator COMP2. A detection is thereby made as to whether the output voltage VOUT is within a predetermined voltage range including the target voltage. As a result, a detection can be made as to whether the output voltage VOUT is within a predetermined voltage range that includes the target voltage, by using a simple circuit configuration.

Second Embodiment

Figure 2:
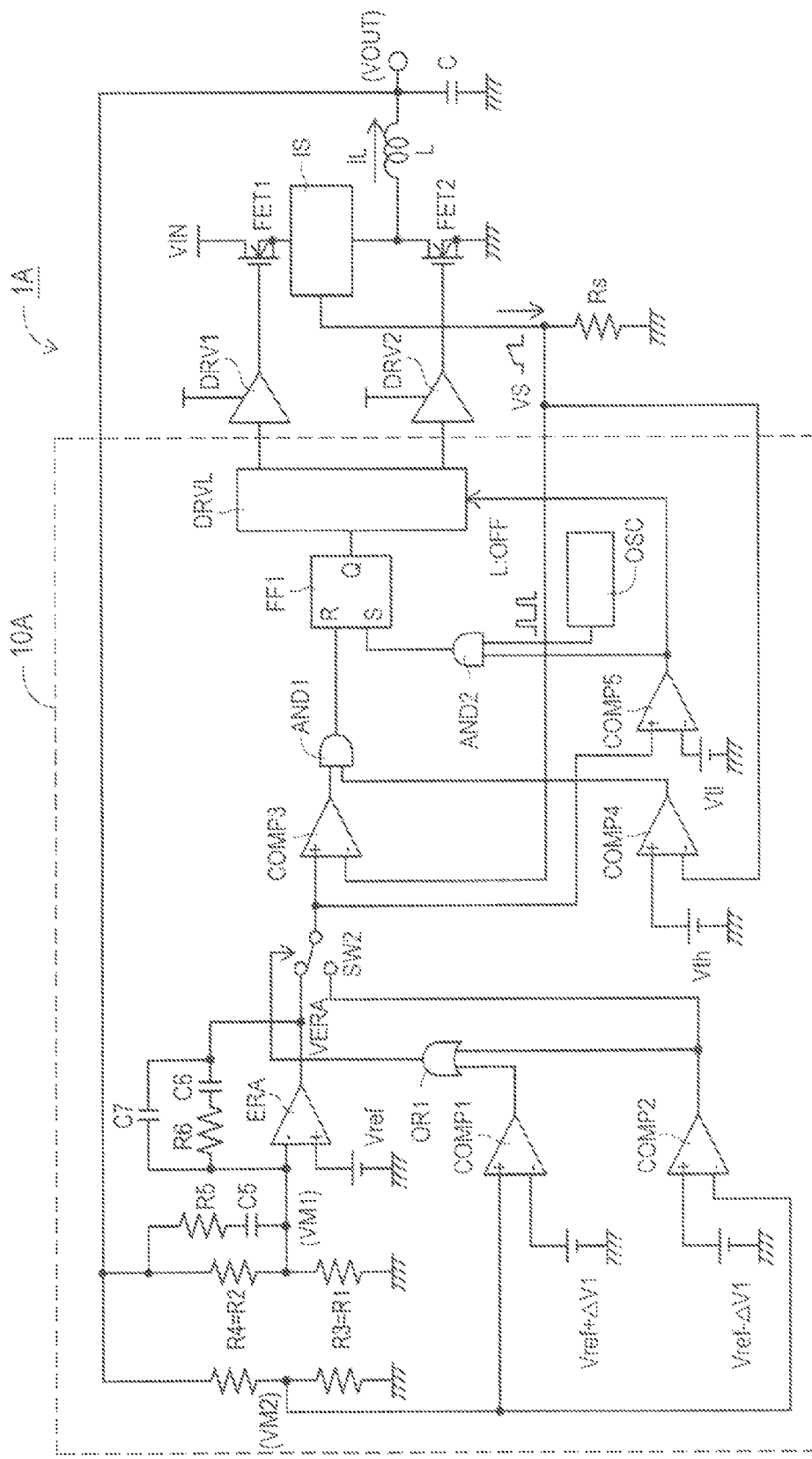
FIG. 2 is a circuit diagram showing a configuration of a DC-DC converter according to a second embodiment.
Figure 3:
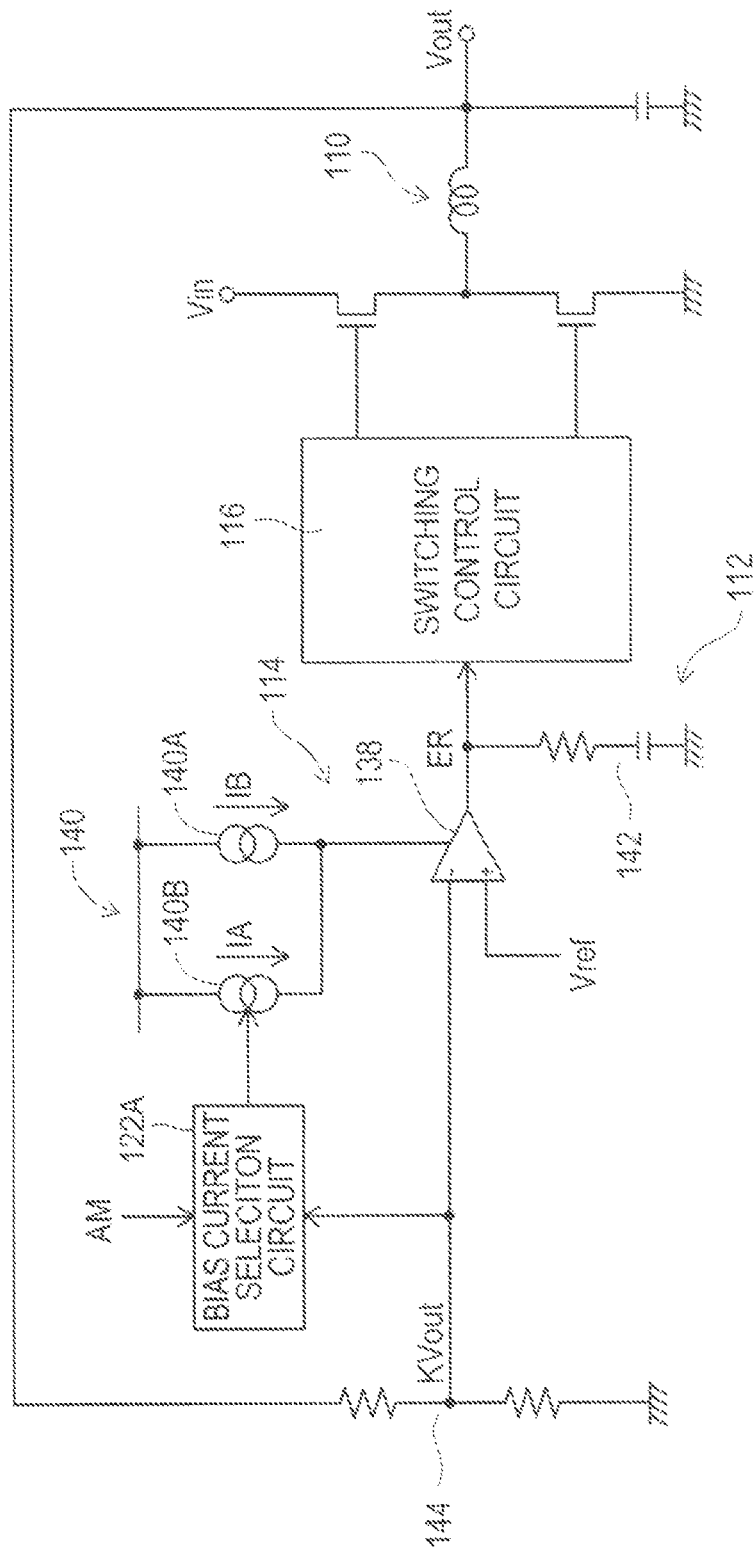
FIG. 3 is a circuit diagram showing a configuration of a conventional DC-DC converter.

FIG. 2 is a circuit diagram showing a configuration of a DC-DC converter 1A according to a second embodiment. The DC-DC converter 1A according to the second embodiment is provided with a control unit 10A which differs from the control unit 10 in the DC-DC converter 1 according to the first embodiment. Accordingly, a description will be given focusing on this control unit, while simplifying or omitting description of units which are the same.

In the control unit 10A of the DC-DC converter 1A according to the second embodiment, the switch SW1 is eliminated and the error amplifier ERA is always provided with phase compensation. In place of eliminating the switch SW1, a switch SW2 is provided that switches connection from the output of the error amplifier ERA or the output of the comparator COMP2 to the non-inversion input terminal (+) of the comparator COMP3.

The switch SW2 is switched by the output of the window comparator consisting of the comparators COMP1 and COMP2 and the OR gate 1. If the output of the window comparator is low level, the output of the error amplifier ERA is selected, and if the output is a high level, the output of the comparator COMP2 is selected.

As a result, if the target voltage is out of the range of ΔV1 as shown by VM2>Vref+ΔV1 or VM2<Vref−ΔV1, a high-speed response that employs the gain of the comparator COMP2 is carried out, and if Vref+ΔV1≧VM2≧Vref−ΔV1, control is carried out stably by providing phase compensation.

The DC-DC converter 1A according to the second embodiment is provided with an error amplifier ERA that amplifies a differential voltage of the output voltage VOUT with respect to the target voltage, a boundary voltage output unit that outputs a voltage value that is equal to or lower than a lower limit voltage value or equal to or higher than an upper limit voltage value of an output voltage in the error amplifier ERA in response to a high or low voltage level of the output voltage VOUT, if the output voltage is not within a predetermined voltage range including a target voltage, and a switch SW2 that switches the error amplifier ERA and the boundary voltage output unit in response to the results detected by the window comparator, whereby setting of the peak current setting value for the coil voltage is carried out. As a result, it is possible to achieve both a high-speed responsiveness that employs the gain of the error amplifier ERA that is not provided with phase compensation and the stability of the control system obtained by providing the phase compensation.

The DC-DC converter 1A according to the second embodiment is provided with the comparator COMP1 that judges that the voltage VM2 at the voltage dividing point is higher than the upper limit threshold voltage (Vref+ΔV1) which is a predetermined voltage range, the comparator COMP2 that judges that the voltage VM2 at the voltage dividing point is lower than the lower limit threshold voltage (Vref−ΔV1) which is a predetermined voltage range, and an OR gate OR1 that executes a logical operation OR on the output signal from the comparator COMP1 and the output signal from the comparator COMP2, whereby a detection is carried out as to whether the output voltage VOUT is in a predetermined voltage range including the target voltage. As a result, a detection can be made as to whether the output voltage VOUT is in a predetermined voltage range including a target voltage, by using a simple circuit configuration.

Further, in the DC-DC converter 1A according to the second embodiment, the comparator COMP2 also functions as a boundary voltage output unit. As a result, a more simple circuit configuration can be obtained.

The disclosure is not limited to the above-described embodiments, and needless to say, various improvements and modifications thereof can be performed without departing from the scope of the embodiment.

For instance, an example is described in the present embodiments of a step-down DC-DC converter, however, the disclosure is not limited to this, and can be similarly applied with respect to a step-up DC-DC converter or other types of DC-DC converters.

The DC-DC converter 1 serves as one example of a current mode DC-DC converter, the DC-DC converter 1A serves as one example of a current mode DC-DC converter, the window converter constituted of the comparators COMP1 and COMP2 and the OR gate OR1 serves as one example of an output voltage detecting unit, the error amplifier ERA, the resistor element R6, the capacitative element C6, the capacitative element C7 and the switch SW1 serve as one example of a peak current setting unit, the resistor element R6, the capacitative element C6 and the capacitative element C7 serve as one example of phase compensation, and the switch SW1 serves as one example of a switching unit. The comparator COMP1 serves as one example of a first comparator, the comparator COMP2 serves as one example of a second comparator, and the comparator COMP2 serves as one example of a boundary voltage output unit.

According to disclosure, it is possible to provide a control circuit of a current mode DC-DC converter, a current mode DC-DC converter and a control method thereof having excellent high-speed responsiveness with respect to fluctuations in the output voltage.

What is claimed is:

1. A control circuit of a current mode DC-DC converter controlling a peak value of a coil current, the control circuit comprising:
    an output voltage detecting unit detecting whether or not an output voltage is within a predetermined voltage range including a target voltage; and
    a peak current setting unit setting a peak current setting value of the coil current to a lower limit value or an upper limit value in response to a high or low voltage level of the output voltage when the output voltage is not within the predetermined voltage range including the target voltage.

2. The control circuit of a current mode DC-DC converter according to claim 1, wherein the peak current setting unit comprises:
    an error amplifier amplifying a differential voltage of the output voltage with respect to the target voltage;
    a phase compensation connected between an input and an output of the error amplifier to stabilize an operational state of a control system; and
    a switching unit cutting off the phase compensation from the error amplifier when the output voltage is not within the predetermined voltage range including the target voltage.

3. The control circuit of a current mode DC-DC converter according to claim 2, wherein the output voltage detecting unit comprises:
    a first comparator judging that the output voltage is higher than an upper limit voltage value of the predetermined voltage range;
    a second comparator judging that the output voltage is lower than a lower limit voltage value of the predetermined voltage range; and
    an OR gate executing a logical operation OR on an output signal from the first comparator and an output signal from the second comparator.

4. The control circuit of a current mode DC-DC converter according to claim 1, wherein the peak current setting unit comprises:
    an error amplifier amplifying a differential voltage of the output voltage with respect to the target voltage;
    a boundary voltage output unit outputting a voltage value equal to or lower than a lower limit voltage value or a voltage value equal to or higher than an upper limit voltage value in an output voltage of the error amplifier in response to a high or low voltage level of the output voltage when the output voltage is not within the predetermined voltage range including the target voltage; and
    a switching unit switching the error amplifier and the boundary voltage output unit in response to a detection result of the output voltage detecting unit.

5. The control circuit of a current mode DC-DC converter according to claim 4, wherein the output voltage detecting unit comprises:
    a first comparator judging that the output voltage is higher than an upper limit voltage value of the predetermined voltage range;
    a second comparator judging that the output voltage is lower than a lower limit voltage value of the predetermined range; and
    an OR gate executing a logical operation OR on an output signal from the first comparator and an output signal from the second comparator.

6. The control circuit of a current mode DC-DC converter according to claim 5, wherein the second comparator also functions as the boundary voltage output unit.

7. The control circuit of a current mode DC-DC converter according to claim 4, wherein an output of the error amplifier or/and an output of the boundary voltage output unit sets a peak value of the coil current.

8. A current mode DC-DC converter comprising a control circuit of a current mode DC-DC converter to control a peak value of a coil current, wherein the control circuit comprises:
    an output voltage detecting unit detecting whether or not an output voltage is within a predetermined voltage range including a target voltage; and
    a peak current setting unit setting a peak current setting value of the coil current to a lower limit value or an upper limit value in response to a high or low voltage level of the output level when the output voltage is not within the predetermined voltage range including the target voltage.

9. The current mode DC-DC converter according to claim 8, wherein the peak current setting unit comprises:
    an error amplifier amplifying a differential voltage of the output voltage with respect to the target voltage;
    a phase compensation connected between an input and an output of the error amplifier to stabilize an operational state of a control system; and
    a switching unit cutting off the phase compensation from the error amplifier when the output voltage is not within the predetermined voltage range including the target voltage.

10. The current mode DC-DC converter according to claim 8, wherein the peak current setting unit comprises:
    an error amplifier amplifying a differential voltage of the output voltage with respect to the target voltage;
    a boundary voltage output outputting a voltage value equal to or lower than a lower limit voltage value or a voltage value equal to or higher than an upper limit voltage value in an output voltage of the error amplifier in response to a high or low voltage level of the output voltage when the output voltage is not within the predetermined voltage range including the target voltage; and
    a switching unit switching the error amplifier and the boundary voltage output unit in response to a detection result of the output voltage detecting unit.

11. A control method of a current mode DC-DC converter for controlling a peak value of a coil current, the control method comprising:
    detecting whether or not an output voltage is within a predetermined voltage range including a target voltage; and
    setting a peak current setting value of the coil current to a lower limit value or an upper limit value in response to a high or low voltage level of the output voltage when the output voltage is not within the predetermined voltage range including the target voltage.

12. The control method of a current mode DC-DC converter according to claim 11, wherein when setting the peak current setting value, the control method comprises:
    amplifying a differential voltage of the output voltage with respect to the target voltage;
    connecting a phase compensation between an input and an output in the amplifying the differential voltage to stabilize an operational state of a control system; and
    cutting off the phase compensation from the error amplifier when the output voltage is not within the predetermined voltage range including the target voltage.

13. The control method of a current mode DC-DC converter according to claim 11, wherein when setting the peak current setting value, the control method comprises:

amplifying a differential voltage of the output voltage with respect to the target voltage;

outputting a voltage value equal to or lower than a lower limit voltage value or a voltage value equal to or higher than an upper limit voltage value in an output voltage of the error amplifier in response to a high or low voltage level of the output voltage when the output voltage is within a predetermined voltage range including the target voltage; and switching the error amplifier and the boundary voltage output unit in response to a detection result of the output voltage detecting unit.

* * * * *